Sept. 1, 1953     W. G. MIDDLETON ET AL     2,650,496
FLUID FLOWMETER WITH HEATED RESISTANCE BRIDGE CIRCUIT
Filed May 17, 1948     2 Sheets-Sheet 1

INVENTORS
W.G. MIDDLETON
K.R. MORE
BY Hudson & Young
ATTORNEYS

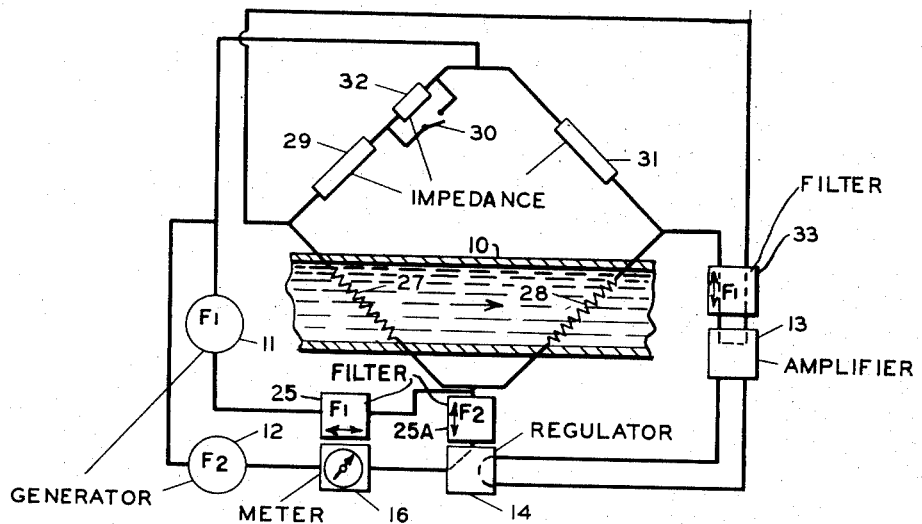
FIG. 3
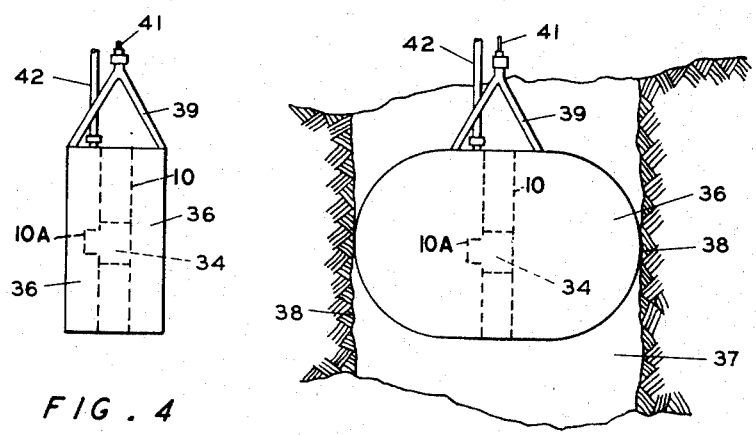
FIG. 4
FIG. 5

Patented Sept. 1, 1953

2,650,496

UNITED STATES PATENT OFFICE 2,650,496

FLUID FLOWMETER WITH HEATED RESISTANCE BRIDGE CIRCUIT

Walter G. Middleton, Bartlesville, Okla., and Kenneth R. More, Vancouver, British Columbia, Canada, assignors to Phillips Petroleum Company, a corporation of Delaware Application May 17, 1948, Serial No. 27,404

14 Claims. (Cl. 73—204)

This invention relates to apparatus for measuring the velocities, and/or rate of flow of fluids. In one specific embodiment it employs a Wheatstone bridge circuit with two arms or branches protected or enclosed from and the other two arms exposed to flowing fluid. In another specific embodiment only one arm is exposed to the flowing fluid and the other arm is exposed to a non-flowing portion of the same fluid. In some embodiments the velocity or rate of flow is obtained from a consideration of the deflection of a galvanometer, or the like, connected across the flow measuring elements and showing the power required to maintain a certain temperature differential between the fluid and at least one of the flow measuring elements.

Instruments of this general type in the prior art all depend for their results upon a measurement of the current through the galvanometer and as the deflection of the galvanometer is proportional, in general, to the cube of the main current, the instrument necessitates a very accurate ammeter if its galvanometer indications are required to have a fair degree of accuracy. For low rates of fluid flow these prior art devices become so inaccurate as to be inoperative, impractical or useless.

Instruments of the prior art also present troublesome adjustments which have to be made for variations in the temperature of the medium whose velocity or rate of flow is measured, and this is a considerable drawback when the apparatus is to be employed in deep oil or gas wells, or in water input wells used in secondary recovery programs.

The simplified Wheatstone circuit of the prior art, in which the velocity or rate of flow indication depends upon the cooling effect of the flowing fluid upon the exposed hot wire element, is obviously readily adaptable to high velocity measurements but not to low velocity measurements since heating of the fluid occurs causing convection currents, in say, fluid flowing at the velocity of a few feet per minute, thus causing false indications.

It is preferred to use alternating currents in this flow meter which permits impedance elements to be employed in the non-temperature sensitive arms of the bridge circuit. It is further preferred to use two alternating current frequencies in this invention in a manner which permits balance of the circuit, as well as to automatically maintain and regulate the temperature of the flow measuring element above that of the fluid by a constant amount.

One object of our invention is to provide improved means for determining accurately the velocity and/or rate of flow of fluids by electrical measurements.

Another object is to measure low rates of flow by said means.

Another object is to provide means to block a conduit to flow except flow through the flow measuring instrument.

Numerous other objects and advantages will be apparent to those skilled in the art upon reading the accompanying specification, drawings and claims.

The present invention measures the velocity (non-vectorially) by means of a Wheatstone bridge circuit, and if the measurement is made in a conduit, or the fluid is forced to flow through a conduit in the instrument, and said conduit has a known area (A) the rate of flow (Q) is a function of the velocity (V) according to the obvious formula:

$$Q=VA$$

One feature of the preferred Wheastone bridge employed in this invention is that by using impedance elements in the non-temperature sensitive portions of the circuit, an alternating current bridge can be used. In the bridge circuit, both temperature sensitive elements are affected correspondingly by any change in the temperature of the fluid, while one temperature sensitive element will respond predominately to the velocity or rate of flow. The galvanometer may be self-recording, and can be calibrated to show velocity, or rate of flow, or both on separate scales.

A specific feature of this invention is to keep the temperature of the velocity of flow measuring element above that of the fluid by a constant amount. Another specific feature of the invention is the provision of a method and means for supplying, or removing current, from the velocity, or flow measuring element, automatically in proportion to the increase, or decrease, in cooling effect of the flowing fluid.

The invention preferably comprises an improvement over the standard Wheatstone bridge hot wire flow meter whereby potential developed across the bridge due to unbalance is amplified, and such amplified potental is applied through a regulator to change the supply of electric heating current to the flow measuring element of the bridge in sufficient amount to maintain constant the temperature differential between that of the flowing fluid and flow measuring element of the active arm of the bridge.

Another feature preferred as useful to carry out the objects mentioned above comprises the use of two sources of alternating current applied at two different frequencies to the measuring arm of the bridge circuit, in such a manner that the two currents remain separated, one energizing the balanceable bridge to supply a current proportional to the unbalance thereof, which current is used to regulate a second current of a different frequency so as to balance the entire circuit; the other regulated to supply power to maintain a constant temperature differential between the flowing fluid and flow measuring element.

Another feature preferred as useful to carry out the objects is an inflatable packer sealing means which seals the flow meter at a predetermined point in a well forcing all fluid flowing past that point to flow through the flow meter.

When a portable power source is used, the recorder and meter, as one unit, can be suspended on a line in a drill hole. The power source and recording may be at the surface and only essential bridge elements suspended on a line in the drill hole. The inflatable packer in each case will have to be inflated from the surface with air, water, or other fluid.

It is obvious that the principles on which this invention depends for its operation as a velocity or flow indicator are (1) the dependence of the cooling of a hot resistance element on the velocity of flow of the fluid in which the measuring element is immersed, and (2) the change of electrical resistance of the element with change in temperature.

Figure 3 is a block circuit diagram of a third illustrative embodiment in which temperature sensitive elements are exposed to the flowing fluid and both having approximately the same resistance;

Figure 4 is an elevational view of a flow meter embodying the flow measuring elements of any one of Figures 1 to 3 in collapsed position;

Figure 5 is an elevational view of the apparatus shown in Figure 4 in inflated position at a predetermined point in a well, the well being shown in cross section.

Figure 1:
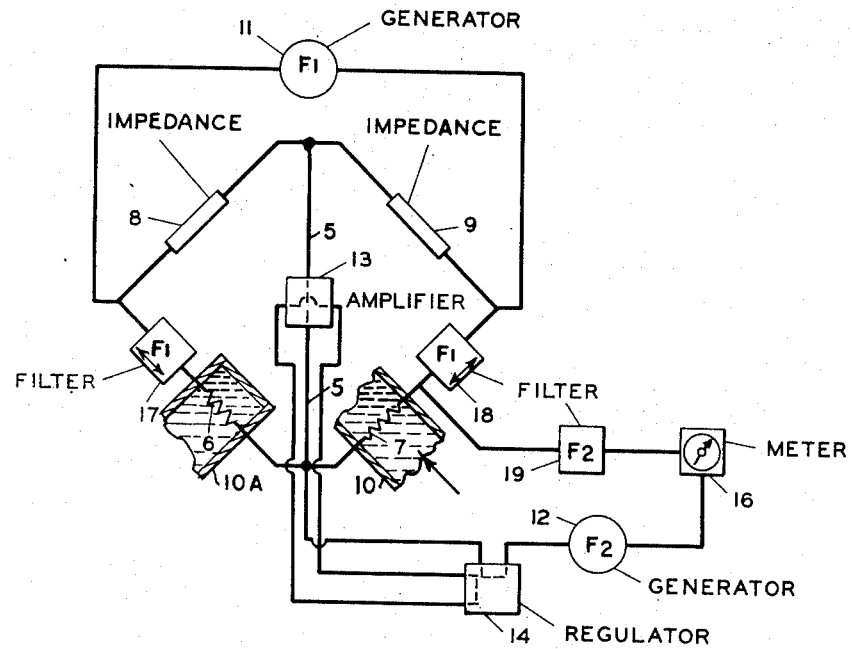
Figure 1 is a block circuit diagram of one illustrative embodiment in which one of the temperature sensitive elements is shielded from the flowing fluid, but exposed to the non-flowing fluid.

In Figure 1, numerals 6 and 7 represent temperature sensitive legs of the bridge circuit and are preferably electrical resistance heating wires of platinum while the other two legs comprise impedance elements 8 and 9, respectively. In this particular arrangement leg 7 is exposed to the fluid flow in a conduit 10 and is maintained at a temperature above that of the flowing fluid by a constant amount, while leg 6 is shielded from the flowing fluid, but exposed to non-flowing fluid in a blind branch 10A of the conduit 10, so that the fluid in 10 and 10A is the same fluid and at the same temperature, the only difference being that it flows through conduit 10 but does not flow appreciably in branch 10A. Element 7 measures the velocity or rate of flow, while element 6 compensates for temperature changes of the fluid encountered as the flow meter is lowered into the drill hole fluid. The temperature of resistance element 7 is maintained at a constant temperature differential above that of the fluid by means of electrical power supplied from generator 12.

The balanced circuit or system shown in Figure 1 comprises a bridge circuit, such as a Wheatstone bridge, having arms 8 and 9 which produce a voltage comparable to the voltage created in arms 6 and 7, the current resulting from the difference in voltages being fed into the input of amplifier 13. A generator 11 provides a constant source of current of a frequency $f_1$. As resistance 7 is constructed with a little less resistance than would be necesssary to provide a balance between arms 6, 7, 8 and 9, there is a resulting flow of current through the input wire 5 of amplifier 13. Wire 5 is connected to the wire connecting impedances 8 and 9 and to the wire connecting resistances 6 and 7 as shown in the drawing. This current in wire 5 energizes amplifier 13 to operate a regulator 14 which controls the output of a generator 12. Regulator 14 therefore includes amplifier 13. Generator 12 is generating a current of a frequency $f_2$ different from the frequency $f_1$. Obviously frequency $f_2$ may be direct current, or can be any other different frequency than $f_1$ sufficiently different to be separated therefrom by filters 17, 18 and 19.

The resistance 7, the amplifier 13, regulator 14, and generator 12 are so proportioned that the current in 5 due to the initial unbalance of bridge 6, 7, 8 and 9 will send enough additional current of frequency $f_2$ through resistance 7 to bring the temperature of the same to a constant temperature differential above that of the fluid in pipe 10. It is understood that as resistance 6 is in a portion of the same fluid at the same temperature in blind conduit 10A as is in conduit 10, that changes in the temperature of the fluid will vary the resistance of 6 and 7 so that current from generator 12 will always maintain the temperature of resistance 7 at a constant temperature differential above that of the fluid. When resistance 7 is at the selected constant temperature differential above the fluid in conduit 10 its resistance has increased thereby approaching that necessary to balance bridge elements 6, 7, 8 and 9, which reduced the current in the amplifier input wire 5. Amplifier 13, through regulator 14, then cuts down on the amount of current of frequency $f_2$ going to resistance wire 7, which in turn reduces the heating effect in wire 7, and thereby the entire system shown in Figure 1 becomes balanced. The balance is reached because a slight reduction in the current through resistance 7 causes a slight increase in the current in wire 5 and vice versa.

As the liquid in 10 flows it has a greater cooling effect on resistance 7 so that more current of frequency $f_2$ from generator 12 is required to maintain 7 at a constant temperature differential above that of the fluid. Therefore, the magnitude of the subsidiary current of frequency $f_2$ that must be supplied to resistance 7 when the fluid flows is the function of the velocity or rate of flow of the fluid. Therefore the system shown in Figure 1 is normally balanced with the temperature of resistance 7 above that of resistance 6.

The amount of heat supplied 7, being a function of the velocity or rate of flow, is measured by meter 16 in the subsidiary circuit. Two different frequencies are used in order that the circuit can be arranged to prevent the heating of 6 by the power supply for the subsidiary heating of 7, and to prevent the introduction of this supply in parallel with 7 from altering the balance of the bridge, as indicated by the meter 16 or amplifier 13. To accomplish this, filters are used. Resonant filter 18 keeps power of frequency $f_2$ from passing through any arm of the bridge circuit except element 7. Filter 17, identical with filter 18 is inserted to keep the impedance of the arm containing 6 equal to that of the arm containing 7. Tuned filter 19 serves to keep power of frequency $f_1$ from passing through the power source 12 which is in the branch in parallel with 7. 14, responsive to amplifier 13, is the regulator or control unit which maintains the temperature 7 above that of the flowing fluid by a constant amount by regulating the power of frequency $f_2$.

Figure 2:
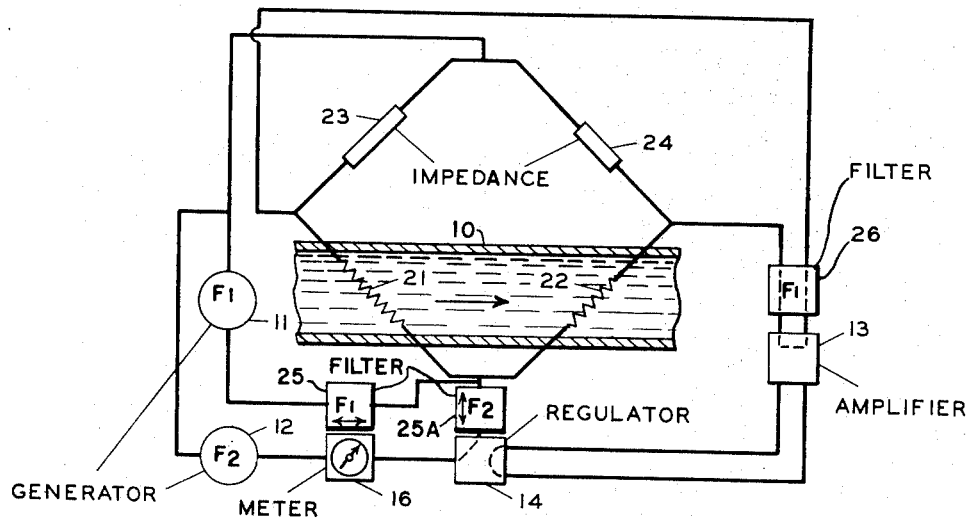
Figure 2 is a block circuit diagram of a second illustrative embodiment in which both temperature sensitive elements are exposed to the flowing fluid, but have different resistances.

In Figure 2 both temperature sensitive elements 21 and 22 are located in the flowing fluid conduit 10. In this circuit filter 26 takes the place of filters 17 and 18 of Figure 1. Filter 26 prevents the power of frequency $f_2$ from reaching the amplifier 13 which detects the unbalance of the bridge circuit as in Figure 1. Resistances 21 and 22 are both preferably of platinum or like material but the resistance of 21 is chosen such that it is of the order of 10 times that of the resistance of 22. The impedance of 23 to 24 is also of the order of 10 to 1 in order to provide a bridge balance. Under these conditions only a small amount of heat will be developed in 21 and the temperature of 21 will rise only slightly above the temperature of the non-flowing fluid. 21 can thus be used in the flowing fluid, since the cooling produced by the flow will be small as compared to the cooling effect on 22. To prevent too much heating 21 is made of wire of the same or greater cross section as 22 and of greater length, thus increasing the mass of metal to be heated and increasing the surface area for cooling. The velocity of rate of flow is determined by meter 16. 13 indicates the amplifier of the bridge unbalance and 14 is the regulator for maintaining the temperature in 22 above that of the fluid by a constant amount.

Regulator 14 keeps the temperature of resistance 22 above that of the fluid in pipe 10 by a constant amount because while both the primary current of frequency $f_1$ and the auxiliary current of frequency $f_2$ are supplied at the same points, namely between the impedances 23 and 24 and between resistances 21 and 22, as resistance 22 is much smaller than the resistance 21 and the impedance 24 is much smaller than impedance 23, most of the current passes through the branch consisting of impedance 24 and resistance 22 while only $\frac{1}{10}$ of the current passes through the branch consisting of impedance 23 and resistance 21. The heating effect in a resistance is equal to $I^2R$ where R is the resistance in ohms and $I^2$ is the square of the current in amps. The size of the currents and resistances involved are such that the square of the current is a larger factor than the size of the resistance, so the bridge 21, 22, 23 and 24 is normally balanced with the temperature of resistance 22 above that of resistance 21. As resistance 21 is exposed to fluid in pipe 10 of the same temperature as encounters resistance 22, resistance 22 is maintained at a constant temperature differential above the temperature of the fluid in conduit 10. The system shown in Figure 2 is balanced with bridge 21, 22, 23 and 24 unbalanced to the extent necessary to supply enough current of frequency $f_1$ through filter 26 to amplifier 13 to supply sufficent current of frequency $f_2$ through regulator 14 to maintain resistance 22 at a constant temperature differential above that of fluid 10. Because the current 22 is greater than in 21 the heating effect of 21 is not appreciable. Generators 11 and 12 act as filters preventing the passage of current from the other generator, however, to make this evident in the drawing this filtering function is repeated by filters 25 and 25A, which obviously may be separate units, if desired.

In Figure 3 both temperature sensitive elements 27 and 28 are used in the flowing fluid in conduit 10 and both having approximately the same resistance, which also implies that the impedance of 29 and 31 are the same. In this particular circuit element 27 can rise in temperature only a very small amount above that of the fluid, thus permitting the use of 27 in the flowing fluid. The power from source 11 of frequency $f_1$ is used to energize the bridge at a very low level, so that 27 will not be heated appreciably, even though 27 has a resistance of the order of 28. An impedance 32 in series with impedance 29, and shorting switch 30, is used to provide a means of unbalance to the bridge circuit, following the initial balancing with 27 and 28 in non-flowing fluid. Such unbalance is maintained at a predetermined level in the circuit after the switch 30 is opened, by heating 28 with power of frequency $f_2$ from source 12. The value of 32 is chosen to give the desired constant temperature differential $\Delta T$ between 28 and the fluid. When 28 is in the flowing fluid, the power required to maintain the temperature $\Delta T$ is a function of the fluid velocity. It can readily be seen that an auxiliary resistance similar to 32 could be used with the circuit shown in Figure 1 with suitable bridge resistances.

The system shown in Figure 3 with switch 30 open adds impedance 32 in series to 29 which reduces the current and heating effect in branch 32, 29 and 27 and increases the current and heating effect in branch 28 and 31. At the same time because the impedance of 29 and 32 unbalances the bridge 29, 32, 27, 28 and 31 a current of frequency $f_1$ is supplied to the input of amplifier 13 which results in a heating current of frequency $f_2$ being supplied to the bridge. The major portion of this current $f_2$ passes through resistance 28, because branch 28 and 31 has less impedance than branch 27, 29 and 32, so resistance 28 is heated a constant amount above the fluid in conduit 10, which increases the resistance of 28 and thereby balances the system shown in Figure 3 with an unbalanced bridge 27, 28, 29, 31 and 32 and a current $f_2$ in resistance 28 from generator 12. The function of filters 25 and 25A is the same in Figure 3 as in Figure 2.

In the above described flow meter circuits the power sources can be maintained at the surface with suitable connections between the sources and the flow meter by use of a multiple wire cable. By suitable arrangement the power sources may be included in the flow meter structure and the entire unit be lowered into the drill hole.

In the operation of the circuit of Figure 1, assuming that impedances 8, 9 are of equal ohmic value, and that there is no flow through conduit 10, amplifier 13 and regulator 14 cause generator 12 to supply sufficient heating current to the resistance 7 as to balance the bridge. It will be understood that this heating current increases the ohmic value of resistance 7 until it is equal to that of resistance 6. Furthermore, the heating current produces a reading upon meter 16 representative of zero flow, and increases the temperature of resistance 7 above that of resistance 6 and the fluid in conduits 10, 10A. The temperature assumed by resistance 7 when the initial heating current passes therethrough may be regarded as a reference temperature corresponding to the ambient temperature of the fluid in conduits 10 and 10A, for this reference temperature causes the ohmic value of resistance 7 to be such as to balance the bridge circuit when the fluid is at the ambient temperature under consideration.

When there is a flow of fluid through conduit 10, the flow causes an additional abstraction of heat from resistance 7 corresponding to the flow rate but not from resistance 6. The temperature of resistance 7, therefore, tends to drop below the reference temperature with resultant decrease in the resistance thereof and unbalancing of the bridge. Accordingly, amplifier 13 and regulator 14 cause generator 12 to supply additional heating current to resistance 7 until it again assumes the reference temperature at which the ohmic values of resistances 6 and 7 are equal and the bridge is balanced. This increased heating current increases the reading of meter 16 by an amount corresponding to the rate of flow of fluid through conduit 10.

If the ambient temperature of the fluid changes, the ohmic values of resistances 6 and 7 both change by a corresponding amount so that such changes do not affect the balancing of the bridge circuit. Thus, a heating current is supplied to resistance 7 at any such changed ambient temperature under zero flow conditions such as to increase its resistance sufficiently to obtain bridge balance and maintain resistance 7 at a reference temperature above that of the fluid in conduit 10. The characteristics of the resistances are so chosen that the heating current under zero flow conditions is the same at any ambient temperature within the range of the apparatus. Similarly, at any such ambient temperature, flow of fluid through conduit 10 produces a corresponding incremental abstraction of heat from resistance 7 causing its resistance to tend to drop with resultant unbalancing of the bridge. This causes an increase in heating current through meter 16 and resistance 7 sufficient to rebalance the bridge, the increase in current flowing through the meter corresponding to the flow rate through conduit 10. Thus, the current of frequency $f_1$ automatically produces a signal in amplifier or sensing means 13 when the bridge is unbalanced, the sensing means controlling the application of the current of frequency $f_2$ to effect the localized heating of resistance 7 until the bridge is balanced.

If impedances 8, 9 are of unequal ohmic value, the foregoing remarks still apply with full force and effect except that the bridge is balanced when the ohmic values of resistances 6, 7 have a predetermined relationship to each other, rather than when they are equal.

In the operation of the circuit of Figure 2, assuming that there is no flow of fluid through conduit 10, when the bridge is balanced, a heating current flows through meter 16 representative of the no flow conditions, this current being zero in some cases. Changes in ambient temperature of the fluid affect the temperature and ohmic value of resistances 21, 22 in proportion to their respective ohmic values, and do not cause any unbalance of the bridge. That is, the circuits are independent of variations in ambient temperature of the fluid in conduit 10. Under these conditions, resistance 22 is at a higher temperature than resistance 21 since the current flow therethrough is considerably greater, and the heating effect varies as the square of the current. However, when fluid flows through conduit 10, it abstracts a greater quantity of heat, proportionately, from resistance 22 than from resistance 21 since, as stated, resistance 22 is maintained at a higher temperature than resistance 21 and the former resistance is specially constructed so as to lose heat readily to the flowing fluid. Accordingly, an unbalance voltage is produced which causes actuation of generator 12 to increase the current of frequency $f_2$ flowing through meter 16 and the bridge. This additional current has a greater effect upon resistance 22 than upon resistance 21 so that, when resistance 22 reaches its original temperature as a result of the additional heating current flowing therethrough, at which its ohmic value is such as to balance the bridge, the additional current flow through meter 16 produces a reading indicative of the flow rate through conduit 10. This additional heating current does not effect the regulator 14 due to the action of filter 26. That is, the current of frequency $f_1$ is utilized primarily to enable sensing of the balanced or unbalanced condition of the bridge while the current of frequency $f_2$ effects a localized heating of resistance 22.

The operation of the circuit of Figure 3 is generally similar to that of Figure 2. In this circuit, the bridge is balanced with switch 30 closed. Changes in ambient temperature do not affect the balance of the bridge since they have a similar effect upon the equal resistances 27 and 28. When switch 30 is opened, the bridge is unbalanced by a predetermined amount, and more current flows through resistance 28 than through resistance 27, thus increasing the temperature of resistance 28. When this predetermined amount of unbalance occurs, the amplifier 13 and regulator 14 are so adjusted that no current, or a preselected current, flows through meter 16, giving a zero flow rate indication. When fluid flows through conduit 10, more heat is abstracted from resistance 28 than from resistance 27, since the former resistance is at a higher temperature. This tends to decrease the ohmic value of resistance 28 and thereby decrease the unbalance voltage fed to amplifier 13 and regulator 14. As a result, the regulator causes additional current of frequency $f_2$ to flow through meter 16 and the bridge until the original unbalanced condition is restored. The additional current passing through meter 16 is indicative of the flow rate of fluid through conduit 10.

The power measuring meter may read only electrical units and the velocity or rate of flow be determined from a calibrated curve for the particular meter. The meter may be self-recording or non-self-recording, and be maintained at the surface or included in the flow meter unit which is lowered into the drill hole.

The flow meter disclosed herein preferably may be included in an inflatable rubber or elastic sealing means as shown in Figure 4. The flow meter unit 34 is situated in the center of the collapsible toroidal elastic membrane 36. Passing through the packer 36 and the flow meter unit 34 is the conduit 10 which is in communication with the fluid in the well above and below the packer 36. A blind conduit 10A is provided as a branch of conduit 10 for use when the system of Figure 1 is employed, in which case resistance 6 is located in branch conduit 10A. Resistance 7 of Figure 1, 21 and 22 of Figure 2, and 27 and 28 of Figure 3 are all located in conduit 10. In Figure 5 is shown the sealing means 36 in expanded position sealing the flow meter 34 in a drill hole 37 and preventing fluid from flowing between 34 and the walls 38 of the drill hole 37. 37 represents a support means attached to the flow meter 34 and to the multiple wire cable 41. 42 represents a tubing through which the sealing means 34 is inflated from the surface.

In operation the flow meter is lowered to a point in the drill hole where it is desired to test for fluid flow either from the strata, or into the strata. The sealing means inflated shuts off that part of the drill hole from the surface. If the fluid is coming from a lower strata none can get by the flow meter and sealing means without passing through the flow meter, thus providing an accurate check on the strata below the same. If the flow meter is used in a water input well, such as in secondary recovery programs, the same procedure is used but the rate of flow of fluid into the lower strata is determined. It is intended that two such sealing means may be used (not shown) when it is desired to check the flow of fluid at a particular point in a drill hole, by packing off above and below the point in question. In such event, the flow measuring means would be in the upper inflatable seal. It is obvious that other types of flow meters could be used with the disclosed sealing means, but the types shown in Figures 1 to 3 are preferred.

It is understood that the circuits described in connection with this invention are to be taken as preferred examples of the same, and that various obvious changes may be made without departing from the invention, the scope of which is defined in the following claims.

Having described our invention, we claim:

1. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filters isolating said second source of current, said heating element and said conductor from the remainder of the flow meter to prevent said second source of current from heating said first, third and fourth arms, filter means in said conductor preventing said first source of current from influencing said meter, means exposing said first arm to a stationary portion of said fluid, and means exposing said second arm to said flowing fluid, whereby said meter indicates a parameter of said rate of flow.

2. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filter means in said conductor preventing said first source of current from influencing said meter, means exposing said first arm to a stationary portion of said fluid, and means exposing said second arm to said flowing fluid, whereby said meter indicates a parameter of said rate of flow.

3. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filters isolating said second source of current, said heating element and said conductor from the remainder of the flow meter to prevent said second source of current from heating said first, third and fourth arms, means exposing said first arm to a stationary portion of said fluid, and means exposing said second arm to said flowing fluid, whereby said meter indicates a parameter of said rate of flow.

4. A flow meter for measuring the rate of flow of a flowing fluid comprising a Wheatstone brige having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filters isolating said second source of current, said heating element and said conductor from the remainder of the flow meter to prevent said second source of current from heating said first, third and fourth arms, filter means in said conductor preventing said first source of current from influencing said meter, and means exposing said second arm to said flowing fluid, whereby said meter indicates a parameter of said rate of flow.

5. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, means exposing said first arm to a stationary portion of said fluid, and means exposing said second arm to said flowing fluid, whereby said meter indicates a parameter of said rate of flow.

6. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filter means in said conductor preventing said first source of current from influencing said meter, and means exposing said second arm to said flowing fluid, whereby said meter indicates a parameter of said rate of flow.

7. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filters isolating said second source of current, said heating element and said conductor from the remainder of the flow meter to prevent said second source of current from heating said first, third and fourth arms, and means exposing said second arm to said flowing fluid, whereby said meter indicates a parameter of said rate of flow.

8. A flow meter for measuring the rate of flow of a flowing fluid comprising a Wheatstone bridge having four arms connected in series, a first source of current connected in shunt with the first and second said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filters isolating said second source of current, said heating element and said conductor from the remainder of the flow meter to prevent said second source of current from heating said first, third and fourth arms, filter means in said conductor preventing said first source of current from influencing said meter, means exposing one of said arms, which arm is one immediately adjacent and connected directly to said second arm, to a stationary portion of said fluid, and means exposing said second arm to said flowing fluid, whereby said meter indicates a parameter of said rate of flow.

9. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filter means in said conductor preventing said first source of current from influencing said meter, means exposing one of said arms, which arm is one immediately adjacent and connected directly to said second arm, to a stationary portion of said fluid, and means exposing said second arm to said flowing fluid, whereby said meter indicates a parameter of said rate of flow.

10. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filters isolating said second source of current, said heating element and said conductor from the remainder of the flow meter to prevent said second source of current from heating said first, third and fourth arms, means exposing one of said arms, which arm is one immediately adjacent and connected directly to said second arm, to a stationary portion of said fluid, and means exposing said second arm to said flowing fluid, whereby said meter indicates a parameter of said rate of flow.

11. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, means exposing one of said arms, which arm is one immediately adjacent and connected directly to said second arm, to a stationary portion of said fluid, and means exposing said second arm to said flowing fluid, whereby said meter indicates a parameter of said rate of flow.

12. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filter means in said conductor preventing said first source of current from influencing said meter, a second heating element in one of said arms, which arm is one immediately adjacent and connected directly to said second arm, means exposing said second heating element to said flowing fluid, and means exposing said second arm to said flowing fluid, the impedance values of the arms of the bridge being so related that one of said heating elements is normally heated to a higher temperature than the other whereby said meter indicates a parameter of said rate of flow.

13. A flow meter for measuring the rate of flow of a flowing fluid comprising a Wheatstone bridge having four arms connected in series, a first source of current connected in shunt with the first and second of said arms, an amplifier having an input circuit coupled to a wire connected in shunt with the second and third of said arms, a heating element in said second arm, means to heat said heating element comprising a second source of current, a conductor connecting said second source of current in series with said heating element, a regulator in said conductor controlled by said amplifier, a meter in said conductor, filter means in said conductor preventing said first source of current from influencing said meter, a second heating element in one of said arms, which arm is one immediately adjacent and connected directly to said second arm, said second source of current being connected across said second heating element for heating the same, means exposing said second heating element to said flowing fluid, and means exposing said second arm to said flowing fluid, the impedance values of the arms of the bridge being so related that one of said heating elements is normally heated to a higher temperature than the other whereby said meter indicates a parameter of said rate of flow.

14. In the combination of claim 12, means to vary the impedance of one of the remaining two arms of said bridge not containing said heating element.

WALTER G. MIDDLETON.
KENNETH R. MORE.

References Cited in the file of this patent

UNITED STATES PATENTS

| Number | Name | Date |
|---|---|---|
| 1,156,630 | Savage | Oct. 12, 1915 |
| 1,291,489 | Hadaway | Jan. 14, 1919 |
| 1,406,682 | Rathbone | Feb. 14, 1922 |
| 1,691,600 | Brush et al. | Nov. 13, 1928 |
| 2,143,962 | Stone | Jan. 17, 1939 |
| 2,366,351 | Patton | Jan. 2, 1945 |
| 2,437,449 | Ames | Mar. 9, 1948 |

OTHER REFERENCES

Thermistors, Their Characteristics and Uses by G. L. Pearson, Bell Laboratories Record, Dec. 1940, pages 106–111 (110).